(No Model.)  J. GÉRARD.  2 Sheets—Sheet 1.

MEAT CUTTER.

No. 368,824.  Patented Aug. 23, 1887.

Witnesses
J. N. Shumway
Fred C. Earl

John Gérard
Inventor
By atty.

(No Model.) 2 Sheets—Sheet 2.
J. GÉRARD.
MEAT CUTTER.
No. 368,824. Patented Aug. 23, 1887.
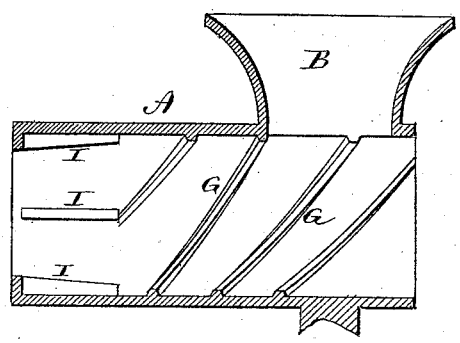
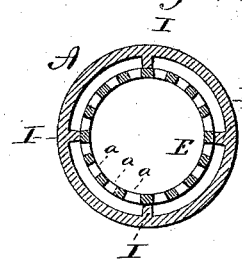
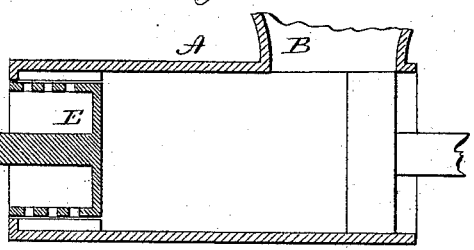
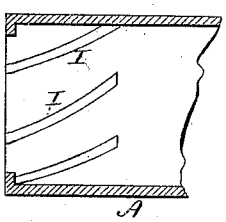
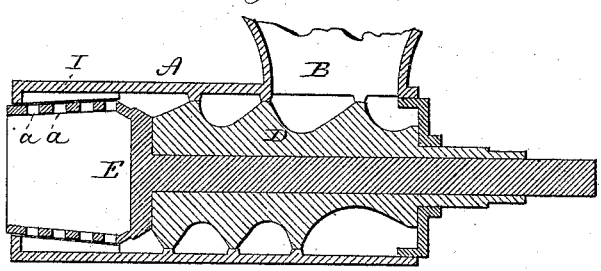
Witnesses
J. N. Shumway
Fred C. Earle
John Gérard Inventor
By atty.
John S. Earle

UNITED STATES PATENT OFFICE.

JOHN GÉRARD, OF NEW BRITAIN, CONNECTICUT, ASSIGNOR TO LANDERS, FRARY & CLARK, OF SAME PLACE.

MEAT-CUTTER.

SPECIFICATION forming part of Letters Patent No. 368,824, dated August 23, 1887.

Application filed May 16, 1887. Serial No. 238,290. (No model.)

*To all whom it may concern:*

Be it known that I, JOHN GÉRARD, of New Britain, in the county of Hartford and State of Connecticut, have invented a new Improvement in Meat-Cutters; and I do hereby declare the following, when taken in connection with accompanying two sheets of drawings and the letters of reference marked thereon, to be a full, clear, and exact description of the same, and which said drawings constitute part of this specification, and represent, in—

Figure 1:
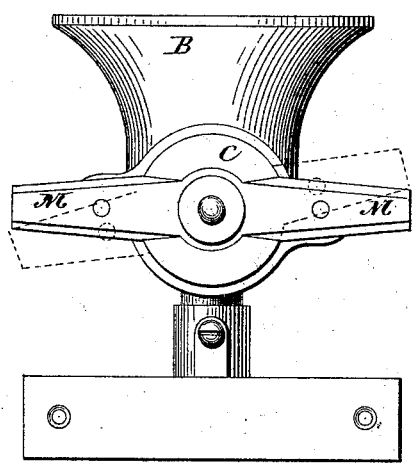
Figure 2:
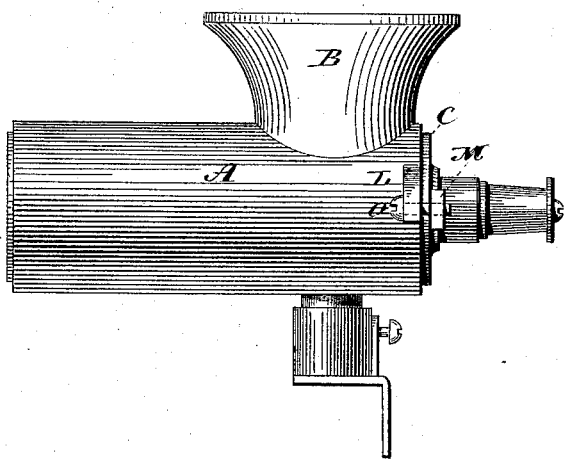
Figure 3:
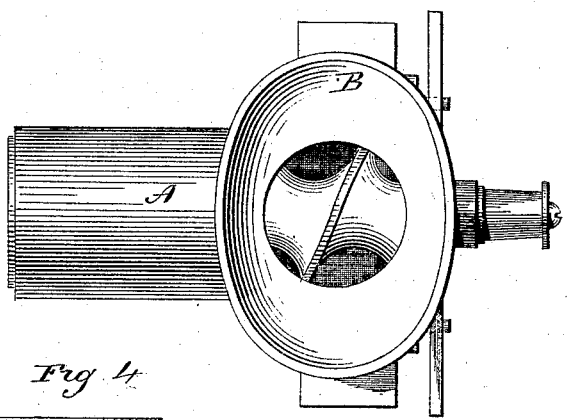
Figure 4:
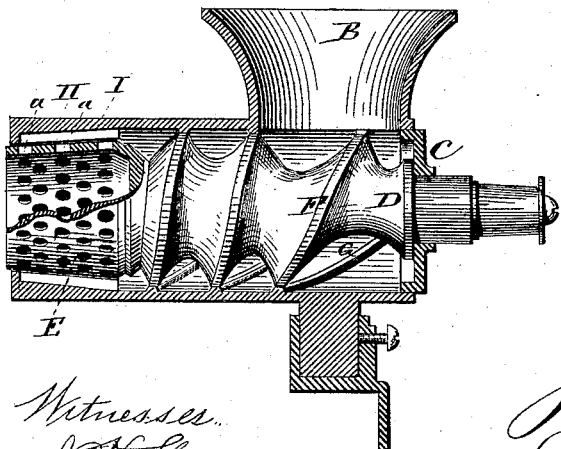
Figure 5:
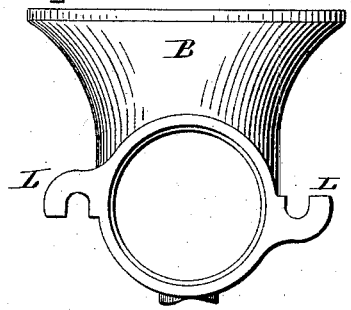

Figure 1, a delivery-end view of the machine; Fig. 2, a side view; Fig. 3, a top view; Fig. 4, a longitudinal central section showing the arbor and perforated cylinder in partial side view; Fig. 5, a delivery-end view of the machine; Fig. 6, a longitudinal central section through the case, showing the ribs on its surface; Fig. 7, a transverse section through the perforated cylinder and the case; Figs. 8, 9, and 10, modifications.

This invention relates to an improvement in machines for cutting or mincing meat or similar plastic substances, and particularly to that class which consist of a cylindrical case having a hopper at one end for the introduction of the meat, with a revolving arbor concentrically in the case, carrying a spiral or screw-like rib as a means for forcing the meat through the case, and the case provided with spiral ribs of a different pitch from the spiral blade of the arbor, whereby as the meat or material is forced through the case it is more or less disintegrated by the action of the revolving spiral rib and the stationary ribs in the case, and in which some means is provided at the delivery end for final action upon the meat to reduce it to its proper minced or cut-up condition.

Various devices have been employed at the delivery end of the machine as a means for the supplemental or final cutting. In some cases it has been a perforated plate forming the delivery end of the case, with a revolving cutter, in connection with the arbor, adapted to work across either the outside or inside of the perforated plate, or both, so that as the meat, under the action of the forcing device, is driven through the perforations the revolving cutter, acting in connection with said perforations, severs the portions of the meat which enter or protrude through the perforations in the plate, and thus produce the final cut or mincing operation. In other cases stationary cutters have been arranged in the case at the delivery end and revolving cutters arranged upon the arbor to work in connection with the said stationary cutters to mince the meat.

The object of my invention is to dispense with such cutters, whereby the machine is simplified, a less number of parts required, the cost of manufacture reduced, and the capacity of the machine increased; and it consists, essentially, of a case and a forcing device adapted to force the material through the case, with a revolving hollow cylinder arranged within the case at its delivery end, the axis of which hollow cylinder is longitudinally in the case, the cylinder perforated, and the surrounding portions of the case provided with ribs, against which said perforated cylinder will work, the said forcing device adapted to force the material into the space between the surface of said cylinder and the walls of the case and into the perforations of the cylinder, so that the perforations in the revolving cylinder will work in connection with the surrounding ribs in the case as cutters to cut off the portions of the material which are so forced into the perforations in the cylinder, as more fully hereinafter described.

A represents the case, which is preferably a hollow cylinder. Near one end it is provided with a hopper, B, by which the material to be cut or minced may be introduced. The cylinder is substantially closed at its one end, C, and through this end an arbor, D, is arranged longitudinally and concentrically through the case, the outer end of the arbor being adapted to receive a crank or other device, by which rotation may be imparted to the arbor. At the other end of the arbor it terminates in a hollow cylinder, E, concentric with the axis of the arbor, and which extends through that end of the case, and so as to take a bearing therein for the support of that end of the arbor, the case being closed around this hollow cylindrical portion E.

Between the hopper end of the case and the hollow cylindrical portion E the arbor is provided with a spiral rib, F, and the interior of the case is provided with spiral ribs G, the pitch of which should be greater than that of the pitch of the spiral rib on the arbor, as seen in Fig. 6. The spiral rib of the arbor is of a diameter corresponding to the internal diameter of the ribs G, so that the spiral rib F may work in substantially close contact with the spiral ribs G in the case. This arrangement of the spiral rib on the arbor and the spiral ribs in the case is a well-known construction in meat-cutting machines.

The diameter of the cylindrical portion E is somewhat less than the internal diameter of the portion of the case which surrounds it, so that between the surface of the cylindrical portion E and the surrounding wall of the case is a concentric chamber, H. Upon the inner surface of this chamber one or more ribs, I, are formed, (see Figs. 6 and 7,) preferably in a longitudinal line, and which extend to the surface of the hollow cylindrical portion E, and so that that cylindrical portion will revolve in substantially close contact with the said ribs I.

The cylinder E is perforated with numerous holes, a, of a size corresponding to the work required.

The operation of the machine is as follows: The meat or material to be cut or minced is introduced through the hopper B in the usual manner. The blade of the revolving arbor receives the meat and forces it through from the receiving end of the cylinder. In its passage, and under the action of the spiral blade of the arbor and the ribs in the case, it is more or less disintegrated. The spiral blade of the arbor forces it toward the delivery end, and finally into the chamber or space H in the case surrounding the revolving hollow cylinder E, and this force causes the meat to enter the perforations in the revolving cylinder, and as the cylinder revolves the meat is brought into contact with the stationary ribs in the case, which ribs, in connection with the perforations in the cylinder, serve as cutters, so that the portions of meat which have been forced into the perforations in the cylinder are severed from the mass and drop into the cylinder, the perforations being again immediately filled by the pressure upon the meat, so that under the constant revolving cylinder and the constant forcing the perforations are constantly filled and the cutting continued, the meat passing out at the open end of the cylinder E in a completely cut-up or minced condition.

The body of the arbor gradually increases in diameter from the receiving or hopper end to the hollow cylinder, as indicated in Fig. 4, so as to make the passage of the meat into the chamber with less resistance than would be the case were the body of the arbor of equal diameter throughout and the entrance to the chamber abrupt.

Preferably the cylindrical portion E is made tapering outward and the working-surface of the surrounding ribs of corresponding shape, as clearly seen in Fig. 4. The end C of the case is made removable, so as to open that end of the case; and as a convenient means for securing the removable end the case is constructed with a projecting hook, L, upon each side, and the end C is constructed with projections M, each carrying a headed screw, O, adapted to engage the hooks L on the case, as seen in Fig. 2, so that by imparting a partial rotation to the end C, as indicated in broken lines, Fig. 1, it will be disengaged from the hooks L, and so as to be readily removed, and when so removed the arbor, with the cylinder, may be readily withdrawn from that end of the case for cleaning and other purposes.

By means of the screws O the head may be moved longitudinally into or out of that end of the case, and the arbor being constructed with a shoulder to bear against the inner surface of the end C, as seen in Fig. 4, such adjustment of the head will produce a corresponding adjustment upon the arbor, so that the tapering hollow cylinder may be forced into closer contact with the surrounding ribs or withdrawn for greater freedom, as occasion may require, thus producing an adjustment of the connecting devices.

For ordinary work I prefer the spiral rib as a forcing device, and this may be with or without the internal ribs on the case, such being a common construction in this class of cutters; but I may substitute for the spiral rib a piston, as indicated in Fig. 8, as a forcing device. In that case it will be better to apply an independent arbor to the cylinder, extending from that end of the case, as also seen in Fig. 8, by which revolution may be imparted to the revolving cylinder; but in the employment of a piston as the forcing device there will not be the preliminary cutting or disintegration of the meat before it reaches the cutting-cylinder. I therefore do not wish to be understood as limiting the invention to any particular forcing device in the case to drive the material through the perforations in the revolving cylinder.

Instead of making the perforated cylinder tapering, it may be made of equal diameter, as also seen in Fig. 8; but the tapering is preferable, because it permits adjustment.

The cylinder may be made as a separate part, independent of the arbor, as indicated in Fig. 8, or it may be made as an integral part of the arbor, as seen in Fig. 4, the latter being desirable when the arbor is constructed to form the forcing device, as seen in Fig. 4. In any case the inner end of the cylinder is preferably closed.

In the chamber surrounding the perforated cylinder the ribs may be parallel with the axis of the cylinder, or may be in spiral shape, as seen in Fig. 9.

In some cases it may be desirable to impart a more rapid revolution to the cylinder than to the arbor. In such case the cylinder will be made independent of the spiral portion of the arbor, the said spiral portion of the arbor made tubular, and the cylinder provided with an arbor which will extend through the tubular arbor, and at the power end of the machine the two arbors provided with independent driving devices, as indicated in Fig. 10. Under this arrangement a differential velocity may be imparted to the forcing-arbor and the cutting-cylinder, or the arbor may extend from the cylinder in the opposite direction, as seen in Fig. 8, the power being applied to the arbors at their respective ends of the case.

I claim—

1. In a machine for cutting meat and similar purposes, the combination of a case to receive the material to be cut, a revolving perforated hollow cylinder in the delivery end of said case, the case constructed with a chamber around said revolving cylinder and the walls of said chamber constructed with one or more longitudinal ribs extending substantially to the perforated surface of said hollow cylinder, and a forcing device adapted to force the material in the case into the chamber surrounding said cylinder and through the perforations in said cylinder, substantially as described, the perforations of said cylinder acting in connection with the surrounding ribs as cutters to sever the material forced into the said perforations.

2. The combination of a case provided with a hopper at one end, through which the material may be introduced to said case, an arbor concentrically and longitudinally through said case adapted to be revolved, the said arbor constructed with a spiral rib from the receiving end of the case toward the opposite or delivery end and the said arbor at the delivery end of the case terminating in a hollow cylinder, the said cylinder perforated and open at its outer end, the case constructed with a chamber around said perforated cylinder, and the said chamber provided with one or more longitudinal ribs, against which said revolving cylinder may work, substantially as described.

3. The combination of a case adapted to receive the material to be cut, an arbor arranged concentrically in said case, said arbor constructed with a spiral rib extending from the receiving end of the case toward the delivery end, the said arbor constructed at the delivery end with a hollow cylinder made as an integral part of said arbor, the said cylinder opening through the delivery end of the case, the said cylinder perforated, the case constructed with a chamber surrounding said perforated cylinder, and the said chamber provided with one or more ribs, against which the perforated surface of said cylinder is adapted to work, substantially as described.

4. The combination of a case adapted to receive the material to be cut at one end, a forcing device adapted to force the material received in the case toward the delivery end of the case, a revolving tapering cylinder in the delivery end of the machine and opening therefrom, the inner end of the cylinder closed, the case constructed with a chamber surrounding said tapering perforated cylinder, and the said chamber provided with one or more ribs, against which the said perforated surface of the cylinder is adapted to work, substantially as described.

5. The combination of a case constructed with a hopper at one end, through which material may be introduced to the case, an arbor arranged longitudinally and concentrically through said case, the said arbor constructed with a spiral rib extending from said receiving end of the case toward the delivery end, the said arbor at the delivery end terminating in a hollow cylinder, the surface of which within the case contracts in diameter outward, the said contracting surface of the cylinder perforated, the case constructed with a chamber surrounding said tapering surface of the perforated cylinder, and the said chamber provided with one or more ribs, against which said perforated surface is adapted to work, the opposite end of the case removable and made adjustable against that end of the arbor, substantially as described.

JOHN GÉRARD.

Witnesses:
 ALEX. BEATTY,
 J. C. ATWOOD.